US007989515B2

(12) United States Patent
Ui et al.

(10) Patent No.: US 7,989,515 B2

(45) Date of Patent: Aug. 2, 2011

(54) FILLING FOAM COMPOSITION, FOAM FILLING MEMBER, AND FILLING FOAM

(75) Inventors: Takehiro Ui, Osaka (JP); Manabu Matsunaga, Osaka (JP); Mitsuo Matsumoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 12/588,724

(22) Filed: Oct. 26, 2009

(65) Prior Publication Data

US 2010/0048747 A1 Feb. 25, 2010

Related U.S. Application Data

(62) Division of application No. 10/547,490, filed as application No. PCT/JP2004/013013 on Sep. 1, 2004, now Pat. No. 7,627,998.

(30) Foreign Application Priority Data

Sep. 2, 2003 (JP) ................................ 2003-309668
Aug. 26, 2004 (JP) ................................ 2004-247247

(51) Int. Cl.
*C08J 9/18* (2006.01)
*C08K 3/22* (2006.01)
*B29C 44/00* (2006.01)
*B32B 1/00* (2006.01)

(52) U.S. Cl. ........................................ 521/55; 428/365

(58) Field of Classification Search .................... 521/65; 428/365
See application file for complete search history.

(56) References Cited

U.S. PATENT DOCUMENTS

| | | | |
|---|---|---|---|
| 4,003,860 | A | 1/1977 | LeClerc |
| 4,048,208 | A | 9/1977 | Spicuzza, Jr. et al. |
| 6,281,260 | B1 | 8/2001 | Hanley, IV et al. |
| 6,458,863 | B1 | 10/2002 | Yoshimura et al. |
| 2003/0055157 | A1 | 3/2003 | Wolfer et al. |

FOREIGN PATENT DOCUMENTS

| | | |
|---|---|---|
| CN | 1010805 | 5/1987 |
| CN | 86106392 | 5/1987 |
| CN | 86106392 A * | 5/1987 |
| DE | 3626349 | 2/1998 |
| EP | 0710696 | 5/1995 |
| EP | 0709425 | 5/1996 |
| EP | 0792906 | 9/1997 |
| FR | 2027760 | 10/1970 |
| GB | 1012478 | 10/1965 |
| GB | 1219338 | 1/1970 |
| GB | 1453070 | 10/1976 |
| GB | 2024227 | 1/1980 |
| JP | 6287340 | 10/1994 |
| JP | 10-095869 | 4/1998 |
| JP | 11-263865 | 9/1999 |
| JP | 2000-085618 | 3/2000 |
| JP | 2001-226663 | 8/2001 |
| JP | 2001226663 A * | 8/2001 |
| JP | 2002-079955 | 3/2002 |
| JP | 2002-79955 | 3/2002 |
| JP | 2003-176413 | 6/2003 |
| JP | 2004-168856 | 6/2004 |
| JP | 2004-244508 | 9/2004 |
| WO | WO 02/08332 | 1/2002 |
| WO | WO 03/055661 | 7/2003 |

OTHER PUBLICATIONS

Translation to CN 86106392 (May 1987).*
Translation to JP 2001226663 A (Aug. 2001).*

* cited by examiner

*Primary Examiner* — Kelechi C Egwim
(74) *Attorney, Agent, or Firm* — Jean C. Edwards, Esq.; Edwards Neils PLLC

(57) ABSTRACT

Filling foam composition capable of providing excellent rust-proofing and also suppressing reduction of a foam ratio of the filling foam composition even when reusing unwanted parts thereof and inferior goods thereof; a foam filling member using the same filling foam composition; and a filling foam produced by foaming the filling foam composition. The filling foam composition is prepared by mixing foamable polymer, a foaming agent, and a basic oxide in such a mixing ratio that a ratio of the basic oxide can be in the range of 0.05-70 parts by weight per 100 parts by weight of foaming agent. The mounting member for the filling foam composition to be mounted in an internal space of a hollow member is produced by mounting a mounting member on the filling foam composition obtained. The filling foam is formed by fitting the foam filling member in the internal space of the hollow member and, then, foaming the filling foam composition by the application of heat.

3 Claims, 1 Drawing Sheet

(a)

(b)

FILLING FOAM COMPOSITION, FOAM FILLING MEMBER, AND FILLING FOAM

CROSS-REFERENCE TO RELATED APPLICATIONS

The present application is a Divisional Application of U.S. patent application No. 10/547,490, filed Aug. 31, 2005, which is a 35 USC 371 national stage entry of PCT/JP2004/013013, filed Sep. 1, 2004, which claims priority from Japanese Patent Application No. 2003-309668, filed Sep. 2, 2003, and from Japanese Patent Application No. 2004-247247, filed Aug. 26, 2004, the contents of all of which are herein incorporated by reference in their entirety.

TECHNICAL FIELD

The present invention relates to filling foam used for filling up a space between members of various types and an internal space of a hollow member, to a foam filling member and filling foam composition used for forming the filling foam.

BACKGROUND ART

It is generally known that foam is filled in a hollow member formed in a closed cross section, such as a pillar of a vehicle, as a filling material, in order to prevent transmission of vibrations and noises of an engine of the vehicle or fluttering sounds of the vehicle to an interior of the vehicle.

Polymer foams comprising various kinds of resins and rubbers are used as the foam to be filled. The polymer foams are used for example in such a manner that prefoam of the polymer foams is set in an internal space of the hollow member before foamed and, then, the prefoam is foamed and crosslinked by application of heat and the like in a baking finish process of the hollow member, to thereby form the foam in the internal space of the hollow member, so as to fill up the internal space, without leaving any space therein.

For example, JP Laid-open (Unexamined) Patent Publication No. 2002-79955 proposed a space filling material comprising at least polymer, a foaming agent, and a cross-linking agent. It also proposed a space-filling-material fixing jig, formed of resin, for holding the space filling material securely in the interior space of an object to be filled.

JP Laid-open (Unexamined) Patent Publication No. Hei 10-95869 proposed cross-linking foam for reinforcing a vehicle body having the composition comprising 50-200 parts by weight of an inorganic filling material, 1-50 parts by weight of a thermally decomposable foaming agent, and 2-10 parts by weight of an organic peroxide per 100 parts by weight of diene synthetic rubber component.

After the components of the prefoam used for forming the foam are kneaded, the prefoam is molded to conform to a shape of the hollow member by an injection molding or by a press molding. However, in these molding processes, unwanted parts, such as runners in the injection molding and burrs in the press molding, are produced incidentally. Also, inferior goods may be produced due to a dimensional error and the like.

These unwanted parts and inferior goods are disposed by burning or by landfill.

In this prefoam (space filling material, cross-linking foam for reinforcing vehicle body, etc.), the foaming agent is decomposed by application of heat in the foaming process, to thereby produce acid. When the acid produced contacts with an inside surface of the hollow member to be filled up with the foam, rust may be formed in the inside surface of the hollow member.

To solve this problem, JP Laid-open (Unexamined) Patent Publication No. 2002-79955 proposed a space-filling-material fixing jig comprising a base for holding the space filling material, supporting legs projected from the base, and valved lugs extended at tip ends of the supporting legs. In use, the base is disposed in the internal space so that the space filling material can be held by the base. On the other hand, the valved lugs are engaged with the hollow member so that the space filling material can be spaced from the inside surface of the hollow member in the internal space of the hollow member to prevent the space filling material from contacting directly with the inside surface of the hollow member before the rustproofing process.

However, when the internal space of the hollow member is so narrow that a sufficient spacing cannot be provided between the space filling material and the inside surface of the hollow member, the space filling material and the inside surface of the hollow member may be put in direct contact with each other and, as a result, rust may still be formed in the inside surface of the hollow member.

Meanwhile, recycling of the unwanted parts and inferior goods can advantageously provide an improved yielding percentage and thus improved cost efficiency. The recycling of the unwanted parts and the inferior goods can impart, in addition to a heat history for original material to be kneaded, an additional heat history for the original material to be re-kneaded and molded. Due to this, a foam ratio of the foam produced by using the recycled material may be decreased at the sequent foaming, as compared with that of the foam produced by using the original material.

The foaming agent is partly decomposed by the application of heat in the kneading and molding processes to thereby produce acid. But, when organic peroxide is mixed to the foaming agent, the organic peroxide is not radical decomposed but is ion-decomposed. As a result, the cross-linking of the foam composition does not proceed in the foaming process, so that sufficient foam of the foam is not obtained.

It is an object of the present invention to provide filling foam composition capable of providing excellent rustproofing and also suppressing decrease of a foam ratio of the foam composition even when reusing unwanted parts thereof and inferior goods thereof; a foam filling member using the same filling foam composition; and a filling foam produced by foaming the filling foam composition.

DISCLOSURE OF THE INVENTION

The present invention provides novel filling foam composition comprising foamable polymer, a foaming agent, and a basic oxide, wherein a mixing ratio of the basic oxide is in the range of 0.05-70 parts by weight per 100 parts by weight of the foaming agent.

Preferably, the filling foam composition of the present invention further comprises organic peroxide.

In the filling foam composition of the present invention, it is preferable that the foaming agent comprises a sulfonylhydrazide compound and/or an azo compound.

In the filling foam composition of the present invention, it is preferable that the sulfonylhydrazide compound is 4,4'-oxybis (benzenesulfonylhydrazide), and the azo compound is azodicarbonamide.

Also, the present invention provides a novel foam filling member comprising the filling foam composition and a mounting member mounted on the filling foam composition and to be mounted in an internal space of a hollow member.

Further, the present invention provides novel filling foam produced by foaming the filling foam composition.

In the filling foam composition of the present invention, even when the foaming agent is decomposed by the application of heat in the foaming process to thereby produce acid, the acid can be neutralized by the basic oxide. Accordingly, the formation of rust in the inside surface of the hollow member can be prevented.

In addition, even when the foaming agent is partly decomposed in the kneading and molding processes of the filling foam composition to thereby produce acid, the acid can also be neutralized by the basic oxide. Accordingly, even when unwanted parts and inferior goods of the once molded filling foam composition are reused, radical decomposition of the organic peroxide can be suppressed to provide a sufficient foam ratio of the foam composition.

As a result, the filling foam composition and the foam filling member of the present invention can produce at low costs filling foam capable of providing excellent rustproofing and also suppressing reduction of a foam ratio of the foam composition even when reusing unwanted parts thereof and inferior goods thereof.

BEST MODE FOR CARRYING OUT THE INVENTION

Figure 1:
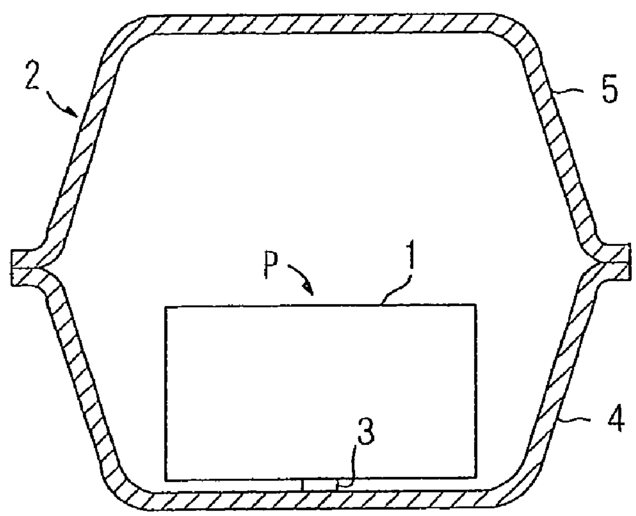
FIG. 1 is a process drawing of an embodiment of a method of filling an internal space of a pillar of an automotive vehicle using filling foam composition of the present invention, a foam filling member of the present invention, and filling foam of the present invention, (a) showing the process of mounting a mounting member on the filling foam composition to produce the filling foam member and setting the filling foam member in the pillar, and (b) showing the process of filling an internal space of the pillar with the filling foam by foaming, cross-linking, and curing the filling foam composition by heating.
Figure 1:
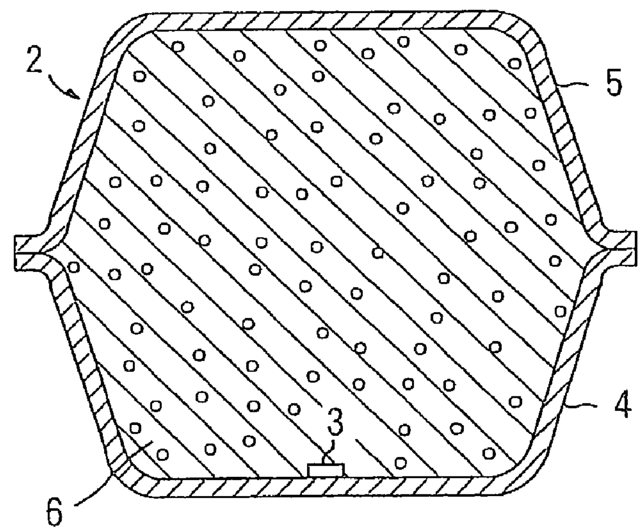

Filling foam composition of the present invention comprises foamable polymer, a foaming agent, and a basic oxide.

In the present invention, known foamable polymer may be used without any particular limitation. The foamable polymers that may be used include, for example, resins, such as ethylene•vinyl acetate copolymer, polyethylene, polypropylene, polyester, polyvinyl butyral, polyvinyl chloride, polyamide, and polyketone, and rubbers, such as styrene-butadiene rubber (SBR), and polybutadiene rubber (BR). Preferably, ethylene•vinyl acetate copolymer is used. The use of ethylene•vinyl acetate copolymer can provide an increased foam ratio. At least one or two kinds of foamable polymer can be properly selected from these foamable polymers.

In the present invention, any foaming agent used for foaming the foamable polymer can be used without being limited to any particular one. The foaming agents that may be used include, for example, a sulfonylhydrazide compound and an azo compound.

In the present invention, any sulfonylhydrazide compound that has at least one —$SO_2$—$NHNH_2$ group in the molecule may be used without being limited to any particular one. The sulfonylhydrazide compounds that may be used include, for example, 4,4'-oxybis(benzenesulfonylhydrazide), p-toluenesulfonylhydrazide, 2,4-toluenedisulfonylhydrazide, p,p-bis (benzenesulfonylhydrazide)ether, benzene-1,3-disulfonylhydrazide, and benzenesulfonylhydrazide. 4,4'-oxybis (benzenesulfonylhydrazide) is preferably used in terms of foamability and safety.

In the present invention, any azo compound that has at least one —N═N— group in the molecule may be used without being limited to any particular one. The azo compounds that may be used include, for example, azodicarbonamide, barium azodicarboxylate, and azobisisobutyronitrile. Azodicarbonamide is preferably used in terms of foamability.

At least one or two kinds of these foaming agents can be selectively used.

In addition to the sulfonylhydrazide compound and the azo compound, a N-nitroso compound, such as N,N'-dinitrosopentamethylene tetramine, or an inorganic foaming agent, such as sodium hydrogen carbonate, and thermally expandable microballoon are also known as the foaming agent.

As to N,N'-dinitrosopentamethylene tetramine, it is requested to be withheld from the use of it from the viewpoint of mutagenicity. As to the sodium hydrogen carbonate, it is decomposed to produce carbon dioxide gas. The carbon dioxide gas is so permeable with the foamable polymer that it is hard to make the foamable polymer foam at a high foam ratio. As to the thermally expandable microballoon, it is required to be added in large quantities to the foamable polymer. When a large quantity of thermally expandable microballoon is added to the foamable polymer, the viscosity is increased due to gas encapsulating shell, so that it is hard to make the foamable polymer foam at a high foam ratio.

In addition to these foaming agents, such as the inorganic foaming agents cited above and the N-nitroso compound, other known foaming agents, such as, for example, alkane fluoride, hydrazine compound, semicarbazide compound, and triazole compound, may also be used in combination with sulfonylhydrazide compound and the azo compound, for intended purposes and applications.

No particular limitation is imposed on a mixing ratio of the foaming agent. For example, a mixing ratio of the foaming agent is in the range of 10-30 parts by weight, or preferably 15-25 parts by weight, per 100 parts by weight of foamable polymer. When the mixing ratio of the foaming agent is less than this, the filling foam composition must be increased in shape to fill up the internal space of the hollow member and, as a result, the workability for the fitting work and the like may be decreased. On the other hand, when the mixing ratio of the foaming agent is more than this, the foam ratio appropriate for the mixing ratio of the foaming agent cannot be obtained and, as a result, the cost efficiency may be reduced.

In the present invention, any basic oxide that can react with acid produced by the decomposition of the foaming agent and can neutralize the acid may be used without being limited to any particular one. The basic oxides that may be used include, for example, calcium oxide (CaO), magnesium oxide (MgO), ferrous oxide (FeO), and ferric oxide ($Fe_2O_3$). At least one or two kinds of these basic oxides can be selectively used.

No particular limitation is imposed on a mixing ratio of the basic oxide. For example, a mixing ratio of the basic oxide is in the range of 0.05-70 parts by weight, or preferably 0.1-50 parts by weight, per 100 parts by weight of foaming agent. When the mixing ratio of the basic oxide to the foaming agent is less than this, the effect of the basic oxide neutralizing the acid produced by the decomposition of the foaming agent is decreased. On the other hand, when the mixing ratio of the basic oxide to the foaming agent is more than this, decomposition temperature of the foaming agent is lowered excessively, so that the timing of foaming and cross-linking is worsened to produce decrease of the foam ratio, rather than increase of the foam ratio.

In addition to the basic oxide of the present invention, the amines can be cited as the material to neutralize the acid produced from the foaming agent. However, the use of the amines provides excessive reduction of the decomposition temperature of the foaming agent as well as the neutralization of the acid and, as a result, the timing of foaming and cross-linking is worsened to produce decrease of the foam ratio.

Preferably, the filling foam composition of the present invention comprises organic peroxide, in order to provide an improved foam ratio.

In the present invention, the organic peroxide is a cross-linking agent used to crosslink the foamable polymer. Any radical forming agent that can be radical-decomposed by the application of heat to form free radical to crosslink the foamable polymer may be used without being limited to any particular one. The radical forming agents that may be used include, for example, dicumyl peroxide, 1,1-ditertiarybutylperoxy-3,3,5-trimethylcyclohexane, 2,5-dimethyl-2,5-ditertiarybutylperoxyhexane, 2,5-dimethyl-2,5-ditertiarybutylperoxyhexyne, 1,3-bis(tertiarybutylperoxyisopropyl)benzene, tertiarybutylperoxyketone, and tertiarybutylperoxybenzoate. At least one or two kinds of these organic peroxides can be selectively used.

No particular limitation is imposed on a mixing ratio of the organic peroxide. For example, a mixing ratio of the organic peroxide is in the range of 0.1-10 parts by weight, or preferably 0.5-5 parts by weight, per 100 parts by weight of foamable polymer. When the mixing ratio of the organic peroxide is less than this, the viscosity rise due to the cross-linking may be reduced so that foam break may be caused by the gas pressure generated by foaming. On the other hand, when the mixing ratio of the organic peroxide is more than this, the cross-linking proceeds so rapidly that the membrane of the foamable polymer may suppress the gas pressure generated by foaming, thus making it hard to foam the foam composition at a high foam ratio.

In the present invention, the filling foam composition may further comprise known additives, such as, for example, filler, foam auxiliary agent, other cross-linking agents, cross-linking accelerator, processing aid, stabilizer, plasticizer, age resister, antioxidant, pigment, colorant, fungicide, and flame retardant.

No particular limitation is imposed on the filler. The fillers that may be used include, for example, calcium carbonate, aluminum hydroxide, magnesium carbonate, magnesium hydroxide, calcium oxide, silicic acid and silicate thereof, mica, clay, talc, mica powder, bentonite, silica, glass beads, glass balloon, shirasu balloon, alumina, aluminum silicate, aluminum powder, carbon black, acetylene black, and Chinese white (zinc oxide). At least one or two kinds of these fillers can be selectively used. The mixing ratio of the filler may be properly selected for intended purposes and applications. The mix of the filler can provide an improved reinforcing effect.

The foam auxiliary agents that may be used include, for example, urea compound, salicylic compound, and benzoic compound. At least one or two kinds of these foam auxiliary agents can be selectively used. The mixing ratio of the foam auxiliary agent may be properly selected for intended purposes and applications.

The other cross-linking agents that may be used include, for example, oximes such as sulfur, sulfur compounds, selenium, magnesium oxide, lead monoxide, zinc oxide, p-quinone dioxime and p,p'-dibenzoyl quinone dioxime, nitroso compounds such as p-dinitroso benzene, resins such as alkyl phenol-formaldehyde resin and melamine-formaldehyde condensate, and ammonium salts such as ammonium benzoate. At least one or two kinds of these cross-linking agents can be selectively used. The mixing ratio of the other cross-linking agent may be properly selected for intended purposes and applications.

The cross-linking accelerators that may be used include, for example, dithiocarbamic acids, thiazoles, guanidines, sulfenamides, thiurams, xanthogenic acids, aldehyde ammonias, aldehyde amines, and thioureas. At least one or two kinds of these cross-linking accelerators can be selectively used. The mixing ratio of the cross-linking accelerator may be properly selected for intended purposes and applications.

The processing aids include, for example, lubricants such as stearic acid, and esters thereof. At least one or two kinds of these processing aids can be selectively used. The mixing ratio of the processing aid may be properly selected for intended purposes and applications.

The filling foam composition of the present invention can be prepared in the form of kneaded material by mixing the components cited above in the mixing ratios specified above and kneading them by using a mixing roll, a pressure kneader, or an extruder, for example, though not limited thereto.

It is preferable that the kneaded material obtained is prepared to have a flow tester viscosity (120° C., 40 kg load) in the range of between $0.5\times10^4$ Pa·s and $1.5\times10^4$ Pa·s, or preferably in the range of between $0.8\times10^4$ Pa·s and $1.2\times10^4$ Pa·s. The kneaded material having a viscosity that falls in that range can allow the kneaded material to be foamed at an appropriate volume expansion ratio (mentioned later).

In the preparation, the kneaded material may be prepared as preform by previously molding it in a predetermined form.

No particular limitation is imposed on the molding of the kneaded material. For example, after the kneaded material is pelletized by using a pelletizer and the like, the pellets obtained are molded in a predetermined form by using an injection molding machine or an extruder under a certain temperature condition under which the foaming agent is not substantially decomposed. Alternatively, the kneaded material may be molded directly into a predetermined form by a calender molding or a press molding.

Then, the filling foam composition of the present invention thus prepared is heated under a proper condition to cause them to be foamed, crosslinked and cured. The filling foam of the present invention can be formed in the manner mentioned above.

The filling foam of the present invention has a density (weight (g) of foam/volume (g/cm$^3$) of foam) that falls within the range of e.g. 0.125-0.05 g/cm$^3$, or preferably 0.10-0.06 g/cm$^3$. Also, the filling foam of the present invention increases in foam ratio (volume expansion ratio) by 8 times or more, or preferably 10-15 times, when foamed. When the filling foam has the foam ratio that falls within this range, the filling foam can fill up the internal space of the hollow member without leaving any space therein, even when the internal space has a complicated space.

It is preferable that the filling foam of the present invention thus produced can has a foam ratio equal to e.g. 65% or more, or preferably 80-110%, of the original foam ratio, when recycled, as mentioned later. When the filling foam can have a foam ratio equal to 65% or more of the original foam ratio, deterioration of the filling foam obtained can be suppressed even when the unwanted parts and the inferior goods produced in the manufacturing process are reused.

The filling foam of the present invention thus obtained can provide various effects for various types of materials, including, for example, reinforcement, vibration-proof, noise insulation, dust-proof, heat insulation, cushioning, and water-tight. Thus, the filling foam of the present invention can be suitably used as the filling material for various industrial products to fill up the space between members of various types and the internal space of the hollow member, including, for example, reinforcing material, vibration-proof material, noise insulation material, dust-proof material, heat insulating material, cushioning material, and water shutoff material.

No particular limitation is imposed on the way of filling up the space between members of various types and the internal space of the hollow member. For example, the filling foam composition is set in place in the space between members to be filled or the internal space of the hollow member to be filled. Thereafter, the filling foam composition set is foamed, crosslinked and cured by the application of heat to thereby form the filling foam and fill up the space between the members or the internal space of the hollow member with the filling foam.

To be more specific, for example when the internal space of the hollow member is filled up, the fitting member is fitted to the filling foam composition to thereby produce the foam filling member, first. Then, the fitting member of the foam filling member is fitted in the internal space of the hollow member and then is foamed by the application of heat, to thereby form the filling foam. The internal space of the hollow member is filled up with the filling foam thus foamed.

A pillar of an automobile can be cited as an example of the hollow member. When the internal space of the pillar of the automobile is filled up, the foam filling member is produced using the filling foam composition of the present invention, first. Then, after the foam filling member is fixed in the internal space of the pillar, the foam filling member is foamed. The filling foam thus foamed can effectively prevent transmission of vibrations and noises of the engine or hissing sounds or fluttering sounds of the automobile to the interior of the automobile.

Next, a method of filling up the interior space of the pillar of the automobile by using the filling foam composition, the foam filling member, and the filling foam of the present invention will be illustrated as an example of an embodiment of the filling foam composition, the foam filling member, and the filling foam of the present invention.

In this method, the filling foam composition 1 formed in a predetermined shape is set in place in the pillar 2 , first, as shown in FIG. 1(*a*). For example, the filling foam composition 1 can be set in place in the pillar 2 in the following manner. First, a mounting member 3 is mounted on the filling foam composition 1 to thereby produce a foam filling member P. Then, the mounting member 3 of the foam filling member P is mounted on an inside surface of the pillar 2. The mounting of the mounting member 3 on the filling foam composition 1 can be performed, for example, by mounting the mounting member 3 on the filling foam composition 1 molded, or by an insert molding wherein the mounting member 3 is molded together with the kneaded material in the process of molding the filling foam composition 1. The mounting of the mounting member 3 on the inside surface of the pillar 2 can be performed, for example, by forming a retaining groove in the inside surface of the pillar 2 and fixedly inserting the mounting member 3 in the retaining groove, by forming the mounting member 3 by an absorption disk, a magnet, and the like and fixing it to the inside surface via absorptive power, magnetic force, and the like, or by forming the mounting member 3 from a metal plate and welding it to the inside surface.

In this mounting process, the mounting member 3 is used to take a protective measurement so that the filling foam composition 1 and the inside surface of the pillar 2 can be spaced apart from each other by the mounting member 3, or so that the filling foam composition 1 can be prevented from contacting directly with the inside surface of the pillar 2 before being subjected to the rust-proofing treatment.

The pillar 2 comprises an inner panel 4 having a cross section of a generally concave form and an outer panel 5 having a cross section of a generally concave form. The pillar 2 is assembled in such a manner that after the filling foam composition 1 is first set in place in the inner panel 4, the inner panel 4 and the outer panel 5 are abutted with each other and welded together at both ends thereof, to form a closed section between the inner and outer panels. The pillar 2 thus formed is specifically used as a front pillar, a side pillar, or a rear pillar of a vehicle body.

Then, in this method, after the inside surface of the pillar 2 is subjected to the rust-proofing treatment, the filling foam composition 1 is foamed, crosslinked and cured by the application of heat (at a temperature of 110-190° C.) in a subsequent process such as, for example, a drying line process at the baking finish, to thereby produce the filling foam 6 , whereby the internal space of the pillar 2 is filled up with the filling foam 6 , leaving no space therein (see FIG. 1(*b*)).

The shape, the placement, the orientation, and the number of arrangements of the filling foam composition 1 may be selected in accordance with the shape of the pillar 2.

In the filling foam composition of the present invention, since the basic oxide is mixed in a mixing ratio of 0.05-70 parts by weight per 100 parts by weight of foaming agent, even when the foaming agent is decomposed by the application of heat in the foaming process to thereby produce acid, the acid can be neutralized by the basic oxide. Accordingly, even when the internal space of the pillar 2 is so narrow that the filling foam composition 1 and the inside surface of the pillar 2 can contact directly with each other to form a contacting part to offer a hindrance to a sufficient rust-proofing treatment, the formation of rust in the contacting part can be prevented.

A further concrete explanation will be given with an example of the filling foam composition comprising 4,4'-oxybis(benzenesulfonylhydrazide) and azodicarbonamide as the foaming agent, dicumyl peroxide as the organic peroxide, and calcium oxide as the basic oxide. First, 4,4'-oxybis(benzenesulfonylhydrazide) and azodicarbonamide are thermally decomposed by the application of heat in the foaming process, so that gases ($N_2$ gas, CO gas) are emitted and also 4,4'-oxybis(benzenesulfinic acid) and cyanic acid are produced as cracked residues, respectively, as shown in the following formulas (1) and (2).

(1)

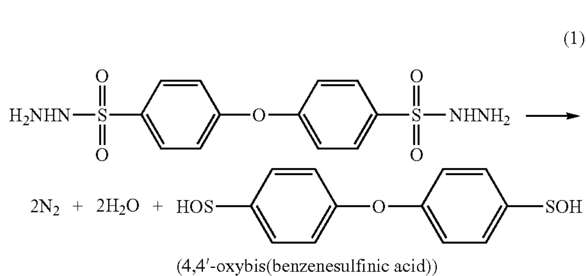

(4,4'-oxybis(benzenesulfinic acid))

(2)

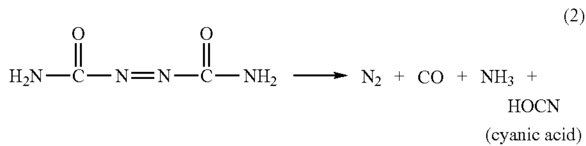

When the internal space of the pillar 2 is so narrow that the filling foam composition 1 and the inside surface of the pillar 2 can contact directly with each other to form a contacting part to offer the hindrance to the rust-proofing treatment, rust is formed in the inside surface of the pillar 2 by the acid produced.

According to the filling foam composition 1 of this embodiment, when an effective dose of calcium oxide is mixed in the filling foam composition 1, 4,4'-oxybis(benzenesulfinic acid) and cyanic acid can be neutralized, as shown in the following formulas (3) and (4), to prevent the formation of rust in the pillar 2.

$$CaO+H_2O \rightarrow Ca(OH)_2+2H^+R^- \rightarrow CaR_2+2H_2O \quad (3)$$

(In the formula, $R^-$ represents an ion of 4,4'-oxybis(benzenesulfinic acid)

$$CaO+H_2O \rightarrow Ca(OH)_2+2HOCN \rightarrow Ca(OCN)_2+2H_2O \quad (4)$$

When the unwanted parts and inferior goods are reused as recycled material, a part of the foaming agent is thermally decomposed by the application of heat in the process of kneading and molding the original material and by the application of heat in the process of kneading and molding the recycled material, so that gases ($N_2$ gas, CO gas) are emitted and also 4,4'-oxybis(benzenesulfinic acid) and cyanic acid are produced as cracked residues, respectively, as shown in the formulas (1) and (2).

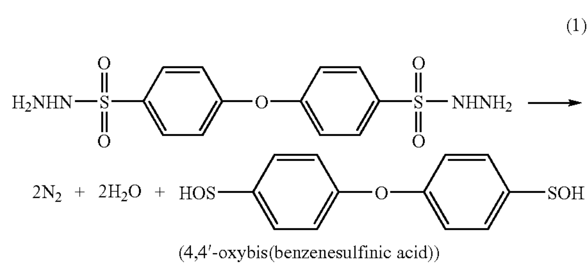

When acids (protons) originating from 4,4'-oxybis(benzenesulfinic acid) and cyanic acid act on dicumyl peroxide, the dicumyl peroxide is not radical-decomposed but ion-decomposed, as shown in the following formula (5).

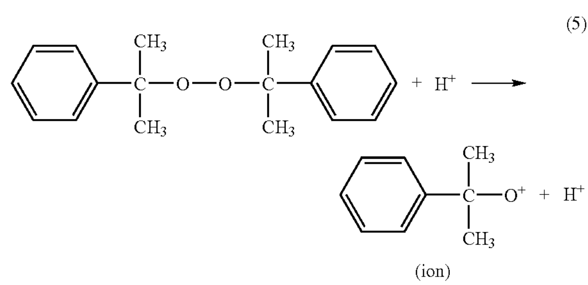

As a result, the number of radicals generated that can contribute to the cross-linking are reduced in the sequent foaming processes, so that the cross-linking does not proceed smoothly, so that sufficient foaming is not provided.

According to the filling foam composition 1 of this embodiment, when an effective dose of calcium oxide is mixed in the filling foam composition 1, the acids (protons) originating from 4,4'-oxybis(benzenesulfinic acid) and cyanic acid can be neutralized, as shown in the following formulas (3) and (4), to effectively prevent the ion decomposition of the dicumyl peroxide.

$$CaO+H_2 \rightarrow Ca(OH)_2+2H^+R^- \rightarrow CaR_2+2H_2O \quad (3)$$

(In the formula, $R^-$ represents an ion of 4,4'-oxybis(benzenesulfinic acid)

$$CaO+H_2O \rightarrow Ca(OH)_2+2HOCN \rightarrow Ca(OCN)_2+2H_2O \quad (4)$$

Hence, the filling foam composition of the present invention can provide the result that when the kneaded material as was prepared is molded to conform to a predetermined shape by an injection molding or an extrusion molding, or by a calender molding or a press molding, the ion decomposition of the organic peroxide can be reduced, as described above. Consequently, when unwanted parts produced in the kneading and molding processes, such as runners in the injection molding and burrs in the extrusion molding, and inferior goods produced in the molding process are re-molded to prepare the prefoam, reduction of the radical decomposition of the organic peroxide can be suppressed to provide a sufficient foam ratio of the filling foam composition.

As a result, when the filling foam composition and the foam filling member of the present invention are used, the filling foam excellent in rustproofing capability and capable of suppressing a decrease of a foam ratio of the filling foam composition even when reusing unwanted parts thereof and inferior goods thereof can be molded at a low cost.

EXAMPLES

The present invention is explained below further concretely with reference to Examples but is not limited thereto.

Preparation of Examples 1-4 and Comparative Examples 1-2

After components of the foamable polymer, the foaming agent, the organic peroxide, and the basic oxide of the respective filling foam composition of Examples 1-4 and Comparative Examples 1-2 were blended in the blending prescription shown in TABLE 1, they were kneaded by mixing rolls at 110° C. at a rotation speed of 20 $min^{-1}$, to prepare the kneaded material. Thereafter, the kneaded material was pressed into a sheet form of 3 mm thick by using a hot press of 110° C. for 1 minute. Then, the sheet was cut into square pieces of 30 mm wide to obtain the original material. The original material thus produced was put on a steel plate as was subjected to a zinc phosphate treatment and heated at 160° C. for 20 minutes, to be foamed. Then, the foaming material obtained and the steel plate were kept for seven days at the temperature of 40° C. and the humidity of 92% RH and, thereafter, the steel plate was taken out and the foaming material was removed from the steel plate. Then, the presence of the rust of the steel plate at a location where the foaming material was put was visually observed. The results are shown in TABLE 1.

It is to be noted that a volume expansion ratio in TABLE 1 was determined from the following expression of Volume expansion ratio=Density before foam/Density after foam.

TABLE 1

| | | Example/Comparative Example | | | | | |
|---|---|---|---|---|---|---|---|
| | | Ex. 1 | Ex. 2 | Ex. 3 | Ex. 4 | Compara. Ex. 1 | Compara. Ex. 2 |
| Foamable polymer | EVA *1 | 100 | 100 | 100 | 100 | 100 | 100 |
| Foaming agent | OBSH *2 | 25 | 25 | 25 | 0 | 25 | 0 |
| | ADCA *3 | 0 | 0 | 0 | 20 | 0 | 20 |
| Basic oxide | Calcium oxide | 0.1 | 10 | 0 | 0.1 | 0 | 0 |
| | Magnesium oxide | 0 | 0 | 0.1 | 0 | 0 | 0 |
| Organic peroxide | DCP *4 | 5 | 5 | 5 | 5 | 5 | 5 |
| Auxiliary foaming agent | Urea compound | 0 | 0 | 0 | 5 | 0 | 5 |
| Rust generated in steel plate | | Not generated | Not generated | Not generated | Not generated | Generated | Generated |
| Volume expansion ratio | Original material | 16.0 | 18.0 | 16.0 | 20.0 | 16.0 | 20.0 |

*1 EVA: ethylene•vinyl acetate copolymer (EVAFLEX EV460, available from DUPONT-MITSUI POLYCHEMICALS CO., LTD., having an MFR content of 2.5 weight % and a vinyl acetate content of 19 weight %)
*2 OBSH: 4,4'-oxybis(benzenesulfonylhydrazide) (NEOSLENE HM806P, available from EIWA CHEMICAL Ind. Co., LTD, having an OBSM content of 80 weight % OBSH, and an EPDM content of 20 weight %)
*3 ADCA: azodicarbonamide (available from EIWA CHEMICAL Ind. Co., LTD)
*4 DCP: dicumylperoxide (PERCUMYL D-40MBK, available from NOF Corporation, having a dicumylperoxide content of 40 weight % and a silica + EPDM content of weight %)
*5 Urea compound (CELLPASTE K5 available from EIWA CHEMICAL Ind.. Co., LTD)

It is found from TABLE 1 that in Examples 1-4 wherein a mixing ratio of the basic oxide was in the range of 0.05-70 parts by weight per 100 parts by weight of foaming agent, corrosion of the steel plate was prevented.

Preparation of Examples 5-8 and Comparative Examples 3-5

After components of the foamable polymer, the foaming agent, the organic peroxide and the basic oxide, and the amines (Comparative Example 5 only) of the respective filling foam composition of Examples 5-8 and Comparative Examples 3-5 were blended in the blending prescription shown in TABLE 2, they were extruded once by a uniaxial extruder (Diameter of screw: 40 mmϕ, L/D=20, Compression ratio: 2.6, Nozzle shape: 3ϕ) at 110° C. at a rotation speed of 20 $min^{-1}$. Then, the extruded material was pressed by a hot press of 110° C. for one minute and formed into a sheet form of 5 mm thick. With the sheet as the original material, the sheet was foamed by heating it for twenty minutes at 160° C. The volume expansion ratio of the foam was measured. The results are shown in TABLE 2.

Then, the original material in the sheet form was extruded again in the same conditions as above and, then, the extruded material was pressed again by the hot press of 110° C. for one minute and formed into a sheet form of 5 mm thick. With this sheet as the recycled material, the sheet was foamed by heating it for twenty minutes at 160° C. The volume expansion ratio of the foam was measured. The results are shown in TABLE 2.

It is to be noted that a volume expansion ratio in TABLE 2 was determined from the expression of Volume expansion ratio=Density before foam/Density after foam.

TABLE 2

| | | Example/Comparative Example | | | | | | |
|---|---|---|---|---|---|---|---|---|
| | | Ex. 5 | Ex. 6 | Ex. 7 | Ex. 8 | Compara. Ex. 3 | Compara. Ex. 4 | Compara. Ex. 5 |
| Foamable polymer | EVA *6 | 100 | 100 | 100 | 100 | 100 | 100 | 100 |
| Foaming agent | OBSH *7 | 25 | 25 | 25 | 25 | 25 | 25 | 25 |
| Basic oxide | Calcium oxide | 1 | 5 | 10 | 0 | 0 | 20 | 0 |
| | Magnesium oxide | 0 | 0 | 0 | 3 | 0 | 0 | 0 |
| Organic peroxide | DCP *8 | 5 | 5 | 5 | 5 | 5 | 5 | 5 |
| Amines | Dicyclohexylamine | 0 | 0 | 0 | 0 | 0 | 0 | 5 |
| Volume expansion ratio | Recycled material | 9.3 | 11.5 | 13.2 | 11.7 | 6.5 | 6.6 | 6.8 |
| | Original material | 13.6 | 13.3 | 13.5 | 12.7 | 12.5 | 10.3 | 6.6 |

*6 EVA: ethylene•vinyl acetate copolymer (EVAFLEX EV460, available from DUPONT-MITSUI POLYCHEMICALS CO., LTD., having an MFR content of 2.5 weight % and a vinyl acetate content of 19 weight %)
*7 OBSH: 4,4'-oxybis(benzenesulfonylhydrazide) (NEOSLENE HM806P, available from EIWA CHEMICAL Ind. Co., LTD, having an OBSH content of 80 weight %, and an EPDM content of 20 weight %)
*8 DCP: dicumylperoxide (PERCUMYL D-40MBK, available from NOF Corporation, having a dicumylperoxide content of 40 weight % and a silica + EPDM content of 60 weight %)

It is found from TABLE 2 that in Examples 5-8 wherein a mixing ratio of the basic oxide was in the range of 0.05-70 parts by weight per 100 parts by weight of foaming agent, a high volume expansion ratio of the foam was obtained even when the recycled material was used for the foam.

While the illustrative embodiments of the present invention are provided in the above description, such is for illustrative purpose only and it is not to be construed restrictively. Modification and variation of the present invention that will be obvious to those skilled in the art is to be covered by the following claims.

INDUSTRIAL APPLICABILITY

As mentioned above, the filling foam composition, the foam filling member, and filling foam of the present invention are suitably used as the filling material for various industrial products to fill up the space between members of various types and the internal space of the hollow member, including, for example, reinforcing material, vibration-proof material, noise insulation material, dust-proof material, heat insulating material, cushioning material, and water shutoff material.

The invention claimed is:

1. A filling foam produced by foaming a filling foam composition which comprises foambale polymer, a foaming agent, a basic oxide, and an organic peroxide as a cross-linking agent, wherein the basic oxide is an oxide that is capable of neutralizing acid produced by decomposition of the foaming agent. and is at least one type selected from the group consisting of CaO, MgO, FeO and $Fe_2O_3$, wherein a mixing ratio of the basic oxide is in the range of 0.05-70 parts by weight per 100 parts by weight of the foaming agent, and wherein the filling foam has a volume expansion ratio of 8 to 20.

2. The filling foam according to claim 1, wherein the foaming agent comprises a sulfonylhydrazide compound and/or an azo compound.

3. The filling foam according to claim 2, wherein the sulfonylhydrazide compound is 4,4'-oxybis (benzenesulfonylhydrazide) and the azo compound is azodicarbonamide.

* * * * *